United States Patent [19]
Takiguchi et al.

[11] Patent Number: 6,058,339
[45] Date of Patent: May 2, 2000

[54] AUTONOMOUS GUIDED VEHICLE GUIDANCE DEVICE

[75] Inventors: Junichi Takiguchi; Hiroshi Sugie; Tatsuya Wakisaka, all of Tokyo; Kyoji Yoshino, Yokohama; Fumihiro Inoue, Kawagoe, all of Japan

[73] Assignees: Mitsubishi Denki Kabushiki Kaisha, Tokyo; Obayashi Corporation, Osaka, both of Japan

[21] Appl. No.: 08/970,609

[22] Filed: Nov. 14, 1997

[30] Foreign Application Priority Data

Nov. 18, 1996 [JP] Japan ................................ 8-306520

[51] Int. Cl.$^7$ ................................ G06F 165/00
[52] U.S. Cl. ................................ 701/28; 701/23; 180/169; 318/587
[58] Field of Search ................................ 701/1, 23, 24, 701/25, 26, 28; 180/167, 168, 169; 318/587; 356/152.2

[56] References Cited

U.S. PATENT DOCUMENTS

| | | | |
|---|---|---|---|
| 4,653,002 | 3/1987 | Barry | 701/23 |
| 4,684,247 | 8/1987 | Hammill, III | 356/152.2 |
| 4,706,773 | 11/1987 | Reinaud | 180/169 |
| 4,855,915 | 8/1989 | Dallaire | 180/169 |
| 4,967,064 | 10/1990 | Field et al. | 180/169 |
| 5,367,458 | 11/1994 | Roberts et al. | 180/169 |
| 5,767,765 | 6/1998 | Shoup | 180/168 |

FOREIGN PATENT DOCUMENTS

| | | |
|---|---|---|
| 0 304 342 | 2/1989 | European Pat. Off. . |
| 61-59507 | 3/1986 | Japan . |
| 9-230933 | 9/1997 | Japan . |
| 2 284 907 | 6/1995 | United Kingdom . |

OTHER PUBLICATIONS

"Development of Material–Handling System in Building Site," Mitsubishi Heavy Industry Technical Reports, vol. 29., No. 5, Sep. 1992, pp. 424–427. (English Abstract Attached).

*Primary Examiner*—Gary Chin
*Attorney, Agent, or Firm*—Burns, Doane, Swecker & Mathis, LLP

[57] ABSTRACT

When material transport was automated on a building construction site, in a conventional travel tape guide system, it was necessary to replace the tape when it became soiled or when changes were made to a travel route. As a result, the usage efficiency of a material transport vehicle could not be improved on the site due to the fact that changes are made to work floors as demanded by construction schedules. According to this invention, there is provided a sign which is easy to move and which is installed at a turning point or an unloading point on a work floor transport route. An image of the sign is obtained by an imaging device on an autonomous guided vehicle and operating instructions are recognized by image processing. This makes it possible to automate the setting of routes and the control of the vehicle.

14 Claims, 13 Drawing Sheets

AUTONOMOUS GUIDED VEHICLE GUIDANCE DEVICE

BACKGROUND OF THE INVENTION

1. Field of the Invention

This invention relates to the automation of transport of construction materials on a building site, and more particularly, to the automation of a horizontal transport process.

2. Description of the Related Art

Figure 11:
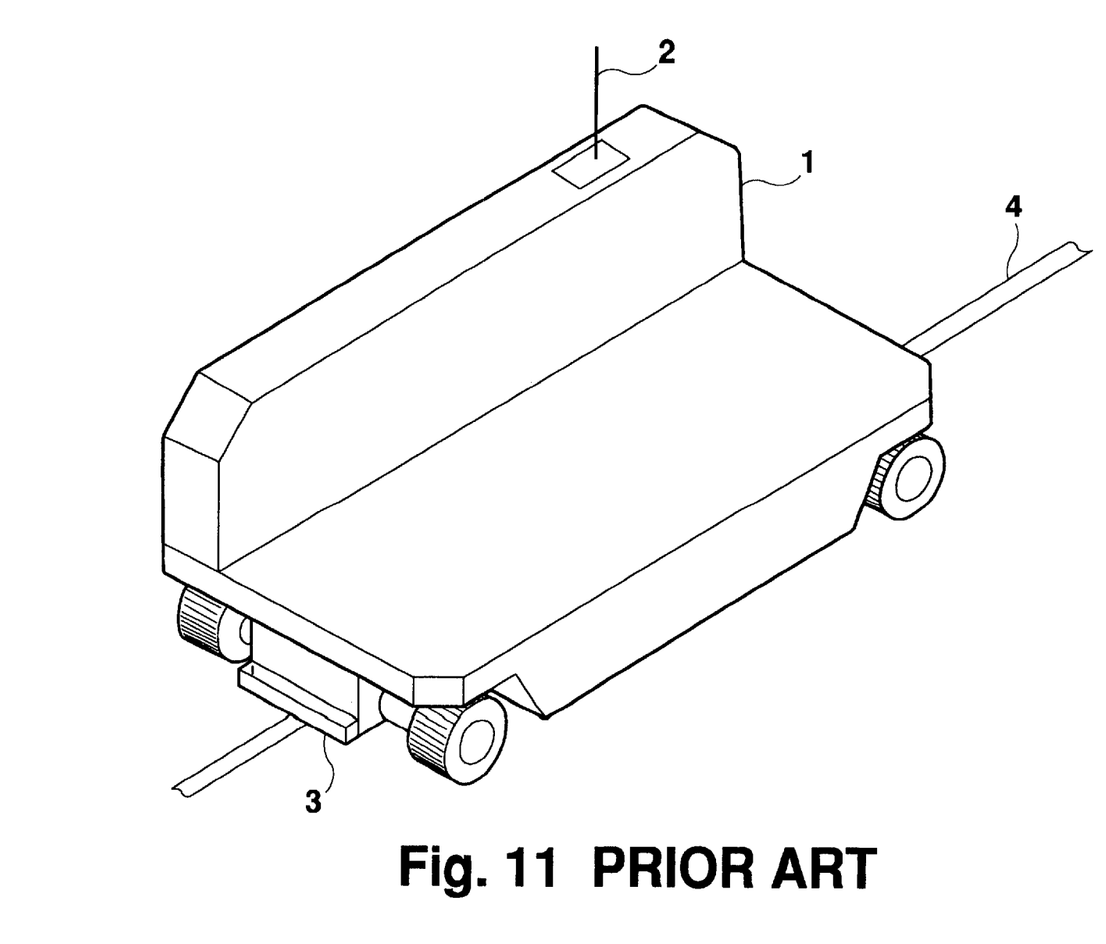
FIG. 11 is an external view of a conventional autonomous guided vehicle and travel tape.
Figure 12:
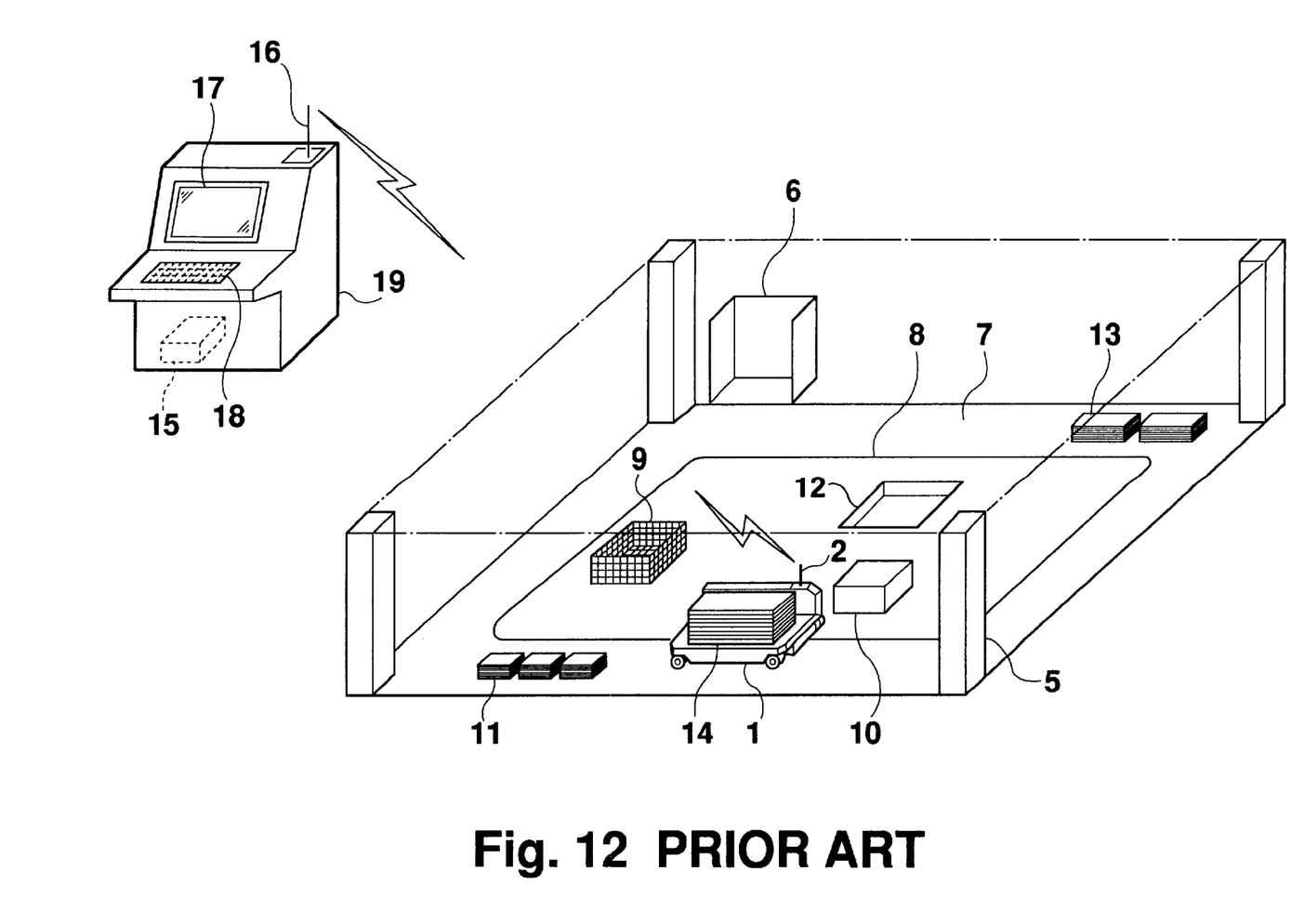
FIG. 12 is a diagram showing a typical application of a conventional autonomous guided vehicle.
Figure 13:
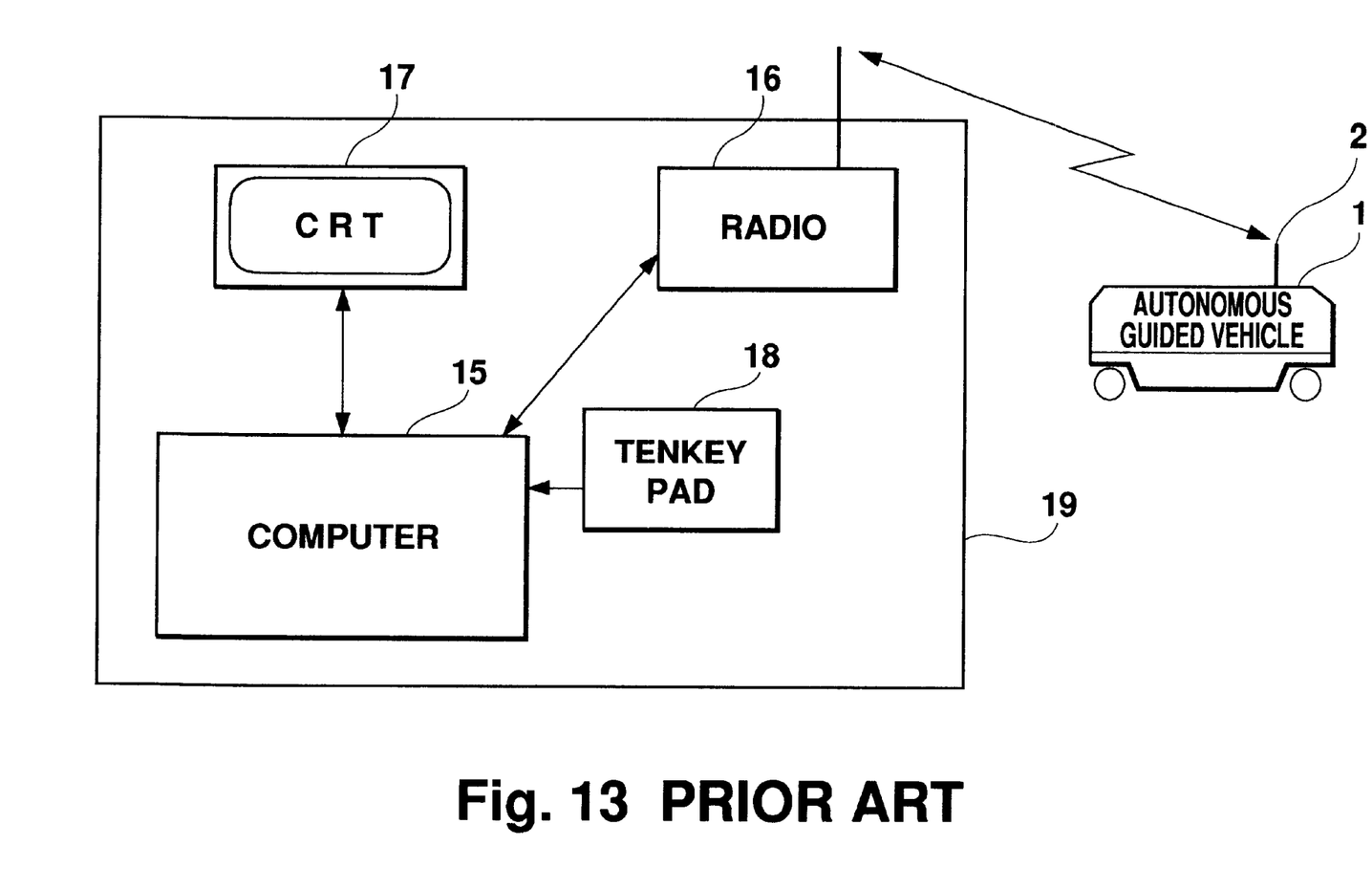
FIG. 13 is a block diagram showing the construction of a conventional autonomous guided vehicle.

An example of this type of device is discussed in, for example, Mitsubishi Heavy Industry Technical Reports Vol. 29, No. 5. p.424–p427. This report gives an overall description of the picking up of loads, setting down of loads and transportation, but herein the prior art automation of horizontal transport will be mainly discussed. FIG. 11 is a simplified diagram of an autonomous guided vehicle essentially illustrating the horizontal transport function. In FIG. 11, 1 is an autonomous guided vehicle, 2 is a radio, 3 is a travel trace sensor, and 4 is a travel tape attached to the surface of a work floor. FIG. 12 is a diagram showing a form of automated horizontal transport according to the prior art. In this figure, 1, 2 are identical to FIG. 11. 5 is a work floor column, 6 is a temporary elevator for vertical transport, 7 is a work floor, 8 is a transport path provided on the work floor, 9 is an obstacle such as a construction tool, 10 is a step which is an obstacle to the travel of the autonomous guided vehicle, 11 is an obstacle such as window glass, 12 is an opening in the floor surface, 13 is an obstacle such as a lightweight concrete wall board, 14 is an object to be transported, 15 is a computer for controlling the autonomous guided vehicle 1, 16 is a radio for sending a signal to the autonomous guided vehicle 1, 17 is a CRT for displaying the output of the computer 15, 16 is a tenkey pad for input to the computer 15, and 19 is a control console integrating the computer 15, radio 16, CRT 17 and tenkey pad 18 which is normally installed in a control room at floor level. FIG. 13 is a block diagram showing the construction of the control system. The symbols 1,2, and 15–19 in the figure are identical to those in FIG. 12.

Next, the operation of this system will be described with reference to the example of FIG. 12 and the block diagram of FIG. 13. A material which has been vertically transported to the work floor by the temporary elevator 6 is loaded onto a loading platform of the autonomous guided vehicle by a worker in front of the elevator. According to a command from the computer 15, the loaded autonomous guided vehicle 1 is guided along the travel tape 4 shown in FIG. 11 to a position where the load is to be unloaded. When the vehicle moves, the light reflected from the travel tape is detected by the travel trace sensor 3 shown in FIG. 11, and any deviation of the autonomous guided vehicle 1 from the travel tape 4 is determined. The deviation is corrected by controlling the left/right steering of the vehicle wheels according to the deviation amount so that the vehicle travels along the travel tape attached to the floor surface.

A command is sent to the autonomous guided vehicle 1 from the computer 15 in the control console 19 installed on the ground floor. Also, signals are sent from the autonomous guided vehicle 1 to the computer 15 via the radios 2 and 16 as necessary. The layouts of all the floors, and the positions at which materials are loaded and unloaded, are previously stored in the computer 15. The computer 15 extracts stored information as necessary according to transport commands input from the tenkey pad 18, and controls the motion of the autonomous guided vehicle 1 accordingly. Loading/unloading data and work completion data from the autonomous guided vehicle 1 is displayed on the CRT 17.

In the aforesaid prior art system, the travel tape 4 was an essential feature for guiding the autonomous guided vehicle. However, the travel tape must be removed when laying floors in the building site, and it can be used in only a limited number of construction processes. Loading/unloading can be performed only on routes where the travel tape is laid on the floor so the transporting of materials lacked flexibility, and it was therefore difficult to use the autonomous guided vehicle more efficiently in building site operations where work floors are constantly being replaced according to the nature of the operation.

For aligning a plurality of materials at a specific point, special path settings and complex programming were required, which was troublesome.

Moreover, dust from materials transported on site and mud brought in on materials from outside soils the travel tape, causing the autonomous guided vehicle to operate erroneously so that it cannot be controlled.

SUMMARY OF THE INVENTION

The applicants have already proposed one method of improving the prior art as Japanese Patent Application No. Hei 8-39216. This invention suggests another improvement.

In a first aspect of the invention, an autonomous guided vehicle guidance device comprises an autonomous guided vehicle which performs route change and stop operations, a plurality of signs indicating a subsequent operation of said autonomous guided vehicle which are disposed on the guidance route of said vehicle and which can be moved to different locations, imaging means for obtaining an image of a sign or images of signs disposed in front of said vehicle, extracting means for detecting a sign at a minimum distance from said vehicle when a plurality of said signs appear in said image obtained by said imaging means or detecting one sign when only one sign appears in said image obtained by said imaging means and for extracting information for performing a subsequent operation contained in said detected sign, and vehicle controlling means for generating a vehicle control signal according to said information extracted by said extracting means and instructing said vehicle to perform an operation change thereby.

In a second aspect of the invention, an autonomous guided vehicle guidance device of the first aspect further comprises a zoom lens for varying an image angle such that an image of said sign is a preset size, and extracting said information for performing said subsequent operation when an image of said minimum distance sign has been arranged to be a preset size by said zoom lens.

In a third aspect of the invention, an autonomous guided vehicle guidance device of the second aspect further comprises means for measuring a distance between said the sign and said autonomous guided vehicle, and said zoom lens comprises means for adjusting a focal length according to said distance supplied by said distance measuring means and varying an image angle such that an image of said sign is a preset size.

In a fourth aspect of the invention, autonomous guided vehicle guidance device of the first aspect also comprises a hook for holding and setting down materials, and said device comprises means for controlling said hook to set down said materials based on the instructions of said sign.

In a fifth aspect of the invention, autonomous guided vehicle guidance device of the first aspect wherein the sign comprises information for performing the subsequent operations of right turn, right turnaround, left turn, left turnaround and stop, and adding identifying information to said subsequent operation information on a forward route and a return route.

In a sixth aspect of the invention, a sign comprises information indicating a subsequent operation of an autonomous guided vehicle which performs route change and stop operations, and said sign which is installed on a guidance route of said vehicle such that said sign may be moved to a different location on said route comprises information for identifying said sign and information indicating said subsequent operation.

In a seventh aspect of the invention, wherein the information for identifying the sign and the information for indicating the subsequent operation are graphic images.

In an eighth aspect of the invention, an autonomous guided vehicle guidance device comprises an autonomous guided vehicle which travels on building construction site work floors, a hook for holding a material at the front of said vehicle, a computer for controlling said vehicle, an operating panel for inputting startup and stop commands of said system, an imaging device for obtaining an image of a sign, a zoom lens of which the focal length is varied according to the distance to said sign and of which the image angle is varied such that the size of said sign in a display is always identical, a strobe for illuminating a sign in front, means for measuring a distance to said sign appearing in said zoom lens, an image processing device for extracting and recognizing said sign based on an image signal from said imaging device, means for detecting an angle of an inertial system of a vehicle body, means for supplying power to a vehicle drive unit, said controlling computer and sensors, turning drive means for turning said distance measuring means, said strobe and said imaging device, a power amplifier for supplying power to said turning drive means, and a sign installed at a change-over point or an unloading point for indicating a curve or change of direction.

In a ninth aspect of the invention, the means for measuring said distance in an autonomous guided vehicle guidance device of the eighth aspect is a laser radar, the means for detecting said angle is a gyroscope, and the means for supplying said power is a battery.

In a tenth aspect of the invention, in an autonomous guided vehicle guidance device of the eighth aspect is provided an opto-electric switch at the front of said material holding hook which permits a material lying on a floor surface to be detected.

In an eleventh aspect of the invention, an autonomous guided vehicle guidance device of the eighth aspect comprises a strobe for emitting near-infrared light (wavelength approximately 850 nm), a zoom lens equipped with a visible light cut filter, and a sign with a light reflecting sheet on which a pattern is drawn.

In a twelfth aspect of the invention, the means for detecting said angle in an autonomous guided vehicle guidance device of the eighth aspect is a flux gate compass (magnetic orientation sensor).

In a thirteenth aspect of the invention, the distance measuring means in an autonomous guided vehicle guidance device of the eighth aspect is milliwave radar.

According to a fourteenth aspect-of the invention, in an autonomous guided vehicle guidance device of the eighth aspect, the distance measuring means is an infrared distancing sensor.

According to a fifteenth aspect of the invention, in an autonomous guided vehicle guidance device of the eighth aspect, the distance measuring means is an ultrasonic wave sensor.

According to a sixteenth aspect of the invention, in an autonomous guided vehicle guidance device of the eighth aspect, the power supply means is an engine generator.

DESCRIPTION OF THE PREFERRED EMBODIMENTS

Embodiment 1

Figure 1:
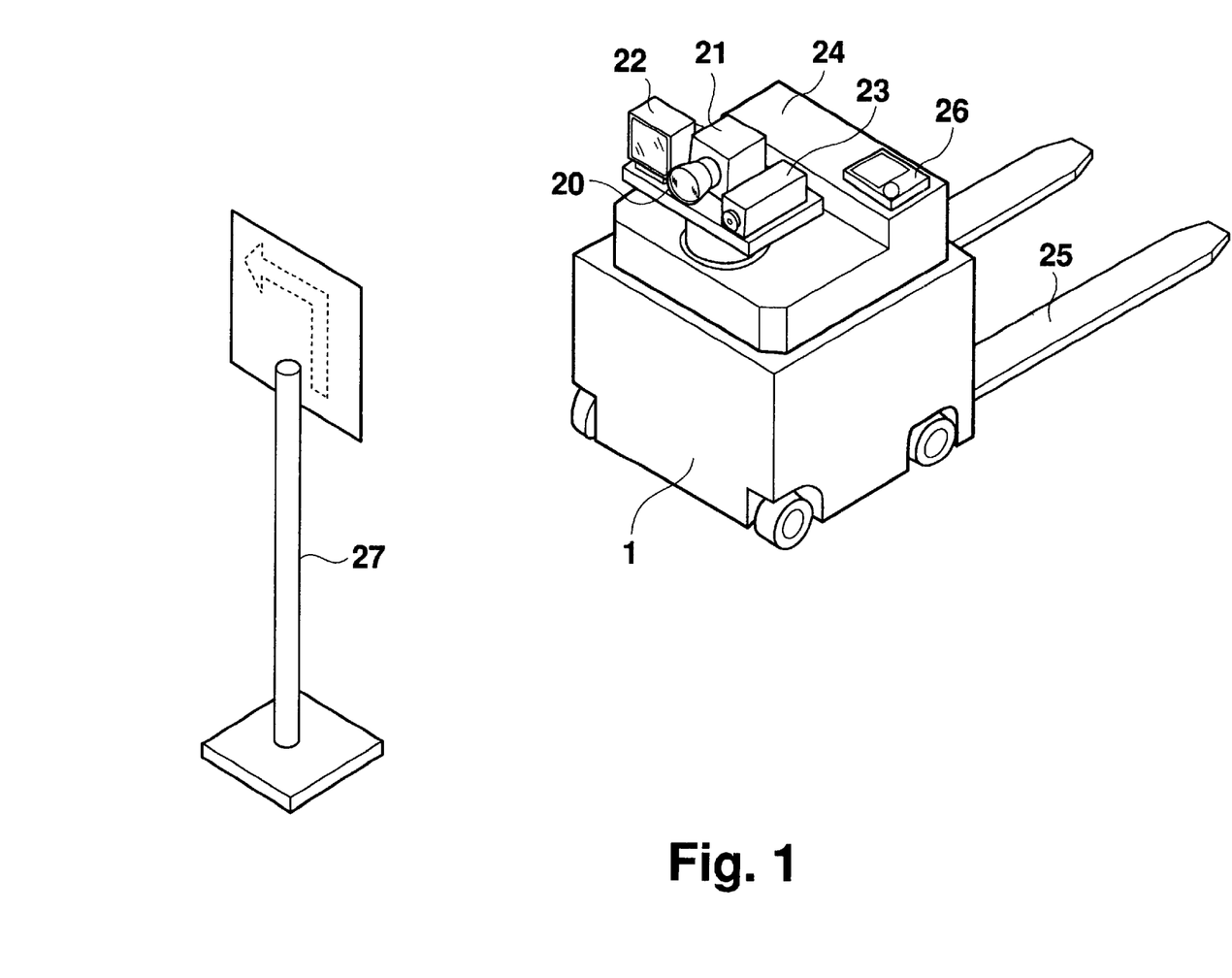
FIG. 1 is an external view of an autonomous guided vehicle and a sign according to a first embodiment of this invention.

FIG. 1 is an external view of an autonomous guided vehicle and a sign according to a first embodiment of the invention. The autonomous guided vehicle 1 is identical to that of the prior art. 20 is a zoom lens of which the focal length is varied according to the distance from the sign and of which the image angle is varied such that the size of the sign in a display is identical, 21 is an imaging device for obtaining an image of this sign, 22 is a strobe having the same cover area as that of the zoom lens of the imaging device, 23 is laser radar having the same cover area in the lateral direction of the zoom lens, 24 is an automation unit integrating electronic components such as a control computer and image processor, etc., 25 are hooks attached to the rear of the autonomous guided vehicle which lift materials and put them down by moving up or down, 26 is a control panel for inputting system startup and stop commands, and 27 is a sign installed at a change-over point or unloading point for indicating a curve or change of direction on the transport path which directs the subsequent operation of the autonomous guided vehicle.

Figure 2:
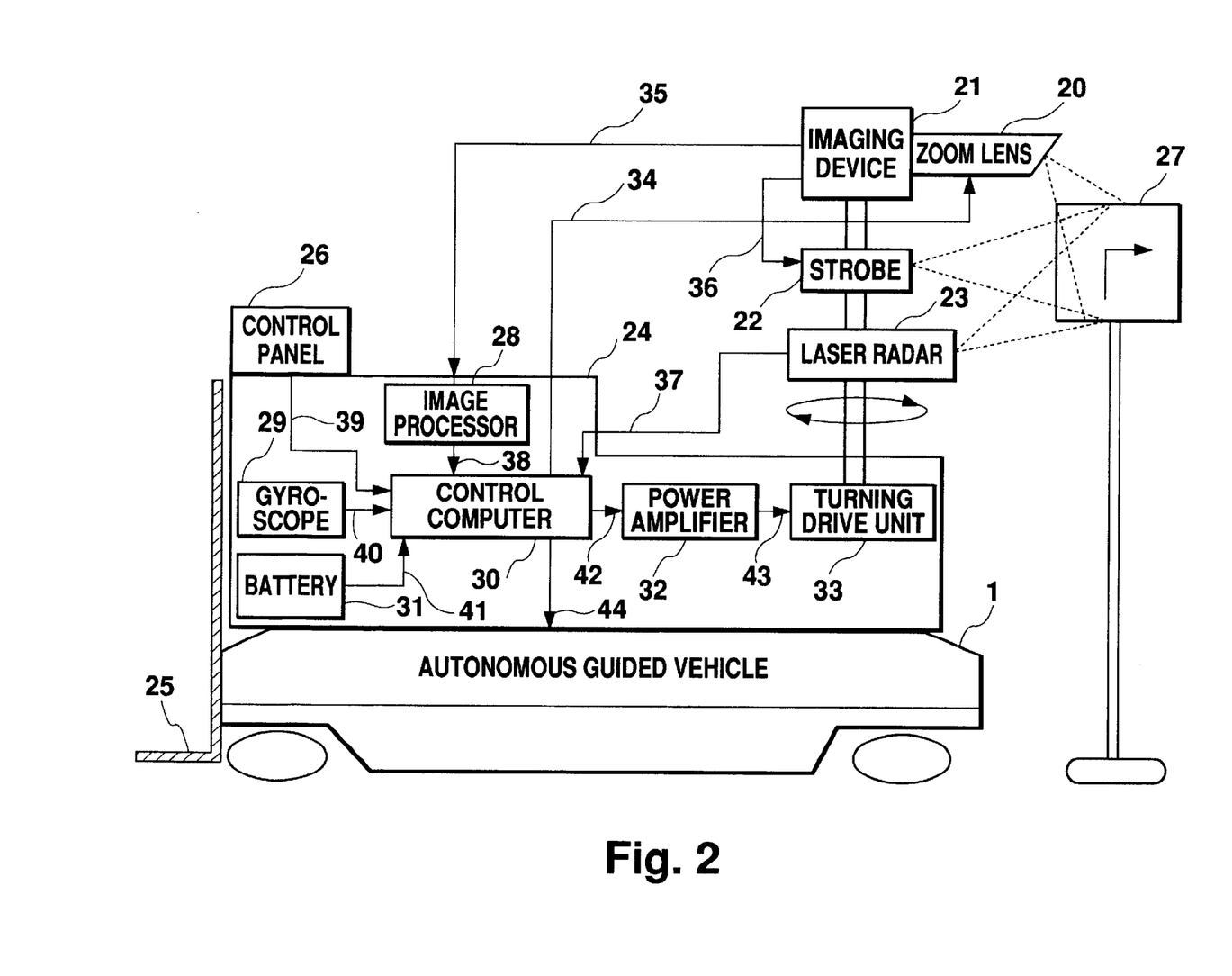
FIG. 2 shows a block diagram of the autonomous guided vehicle and the sign according to the first embodiment of this invention.

FIG. 2 is a block diagram of the autonomous guided vehicle of FIG. 1 and a drawing of the sign for indicating the transport route. In FIG. 2, 1 and 20–27 are identical to FIG.

1. 28 is an image processor for extracting and recognizing the sign based on a signal from the imaging device, 29 is a gyroscope for detecting an angle of the inertial system of the vehicle body, 30 is a control computer, 31 is a battery for supplying power to a vehicle drive unit, and to the control computer and sensors, 32 is a power amplifier for supplying power to a turning drive unit according to a turning angle command signal 42 from the control computer, 33 is a turning drive unit for turning the imaging device, strobe and laser radar, 34 is a zoom lens control signal, 35 is a video signal from the imaging device, 36 is a strobe sync signal for obtaining an imaging timing and strobe light emission timing, 37 is a signal indicating the distance to the sign measured by the laser radar, 38 is a sign recognition result and indicates the distance from the center of the image to the center of the sign (number of picture elements), 39 is a system startup/stop signal, 40 is an inertial system angle signal, 41 is the power supplied by the battery, 42 is a turning angle command signal computed by the control computer, 43 is a turning drive signal which is the turning angle command signal 42 amplified by the power amplifier 32, and 44 is an autonomous guided vehicle control signal which moves the autonomous guided vehicle forwards, backwards or turns it around.

Figure 3:
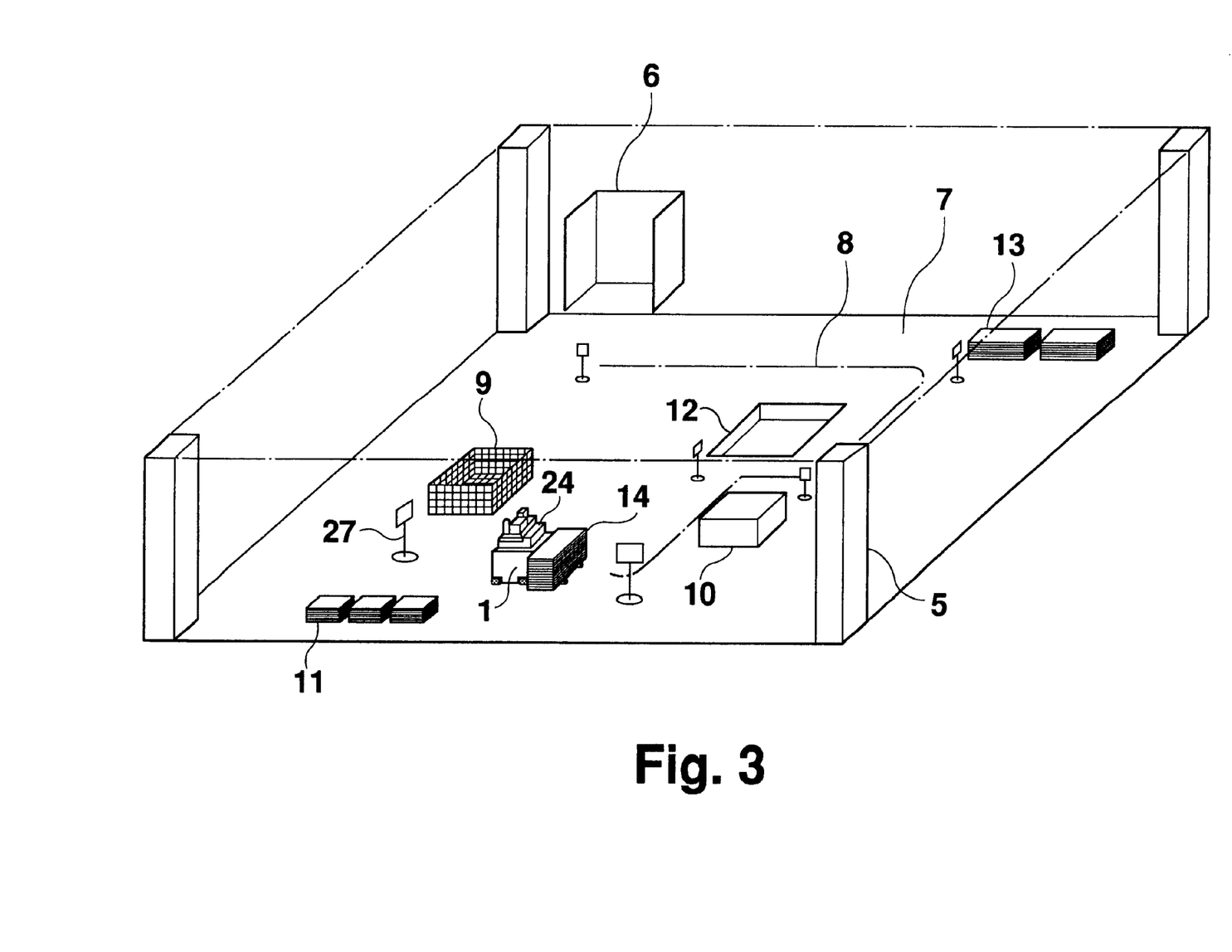
FIG. 3 is a diagram showing a typical application of the autonomous guided vehicle according to the first embodiment of this invention.

FIG. 3 is a drawing showing an automated transport operation according to the first embodiment. 1 and 5–14 are the same as in the prior art. 24, 27 are the same as in FIG. 2. First, worker plans a transport route to a destination from a position in front of a temporary elevator 6, avoiding obstacles such as objects, columns or floor openings. Next, signs 27 are installed along the transport path indicating a new direction in which to turn or a subsequent operation at each bend in the route. The sign 27 is installed at such a height that the center of a pattern on the sign coincides with the center in a vertical direction of line of sight of the imaging device 21 shown in FIG. 2.

Figure 4:
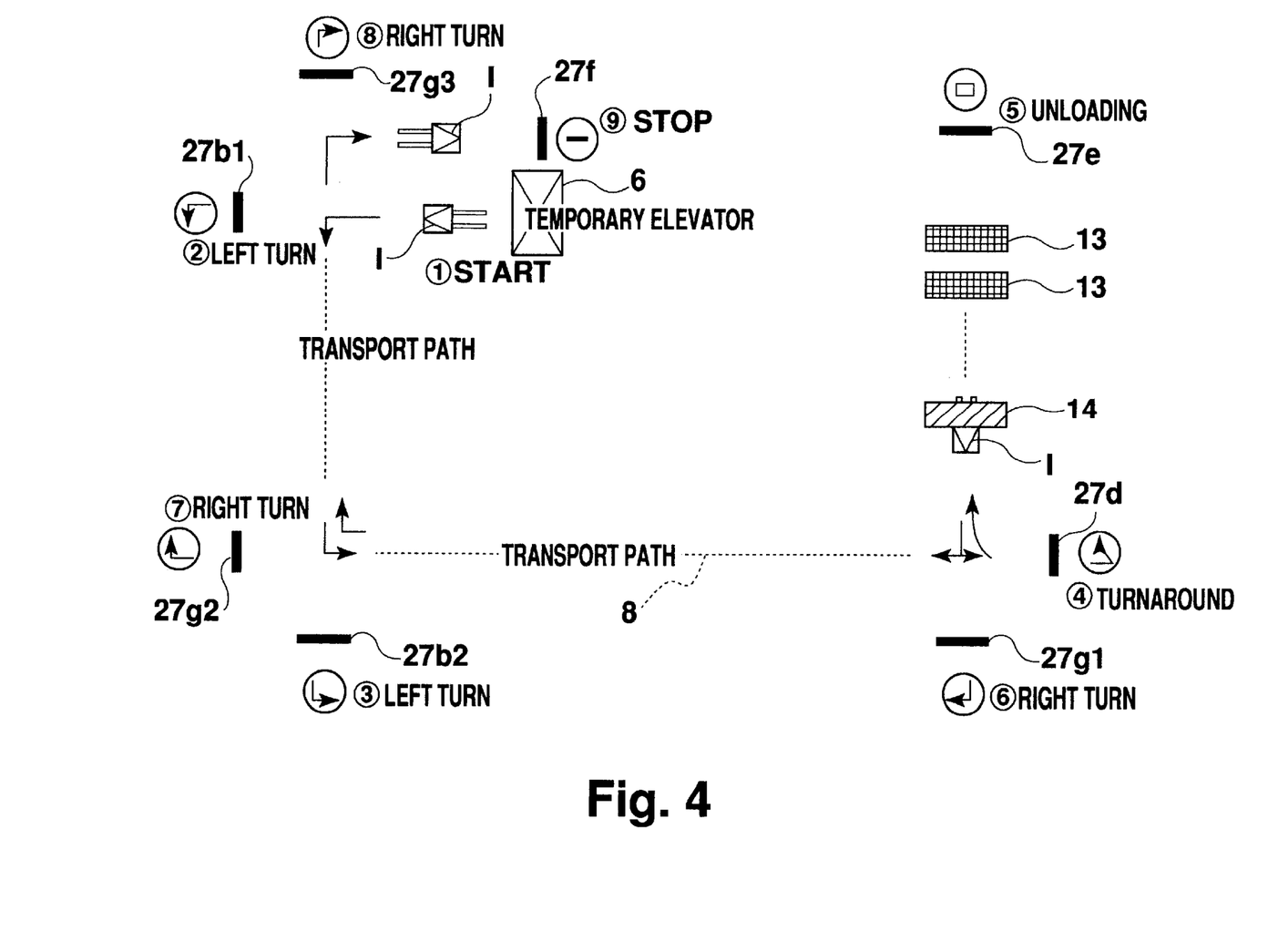
FIG. 4 is an example of a transport route according the first embodiment of this invention.

FIG. 4 shows a typical example transport route. The operation of the system will now be described based on this specific example. 1, 6, 8, 13, 14, 27 are the same as in FIG. 3. First, the autonomous guided vehicle 1 waits in front of the temporary elevator 6. When materials are placed on the elevator 6 and lifted to the work floor, a worker approaches the autonomous guided vehicle 1 and manually controls the vehicle so that the materials are loaded on the hooks 25. Next, the vehicle 1 is made to point to a first sign positioned in front of the elevator 6, and operation is changed over to an automatic transport mode from the control panel 26 on the vehicle 1.

The vehicle 1 begins to scan the signs in front of it, and when it captures a target 27*b*1, a left bend (forward path) which is the first sign, it extracts the sign from the background by a sign extraction and recognition method described hereafter, and moves forward while tracking the image on the sign so as to approach the sign. When it approaches a set distance, it turns 90 degrees to the left based on the recognition result. After turning, it immediately starts to scan the sign in front, and captures a second left bend (forward path) sign 27*b*2. When it approaches the second left bend sign 27*b*2 by image tracking, it again turns 90 degrees to the left. After turning, it immediately captures the left-turn sign 27*d* in front of it, a turning angle command signal 42 corresponding to 180 degrees is output by the control computer 30 shown in FIG. 2, the turning drive unit is turned through 180 degrees via the power amplifier 32, and the imaging device 21, strobe 22 and laser radar 23 are pointed backwards (on the side where the hooks 25 are installed) Subsequently, the vehicle turns 90 degrees to the left in the reverse state (i.e. in the state where the vehicle moves forward with the hooks 25 in front). After turning, the vehicle 1 scans a sign in front of it as it moves directly forwards in this reverse state, captures the unloading sign 27*e*, and stops at a set distance from the sign. The hooks 25 are then operated so as to unload the materials. After unloading, reversing is stopped, and after the turning drive unit is turned through −180 degrees to make the imaging device 21, strobe 22 and laser radar 23 point in front, the vehicle 1 starts to move forward and captures a first right-hand turn (return path) sign 27*g*1. After turning right as indicated by the first right-hand turn (return path) sign 27*g*1, a second right-hand turn sign 27*g*2 is captured. After turning right as indicated by the second right-hand turn (return path) sign 27*g*2, a third right-hand turn (return path) sign 27*g*3 is captured, and after turning right, a stop sign 27*f* is captured. When it approaches a set distance, the vehicle 1 stops as indicated by the stop sign 27*f*. After stopping, a worker waiting in the vicinity of the temporary elevator 6 changes over to the manual mode and thereby terminates the automatic transport mode from the control panel 26 on the vehicle 1. Subsequently, materials are transported by repeating the process of manually picking up of materials in front of the elevator and automatically transporting them.

The operating sequence for implementing the aforesaid operation will now be described in detail with special reference to the computations performed by the control computer 30.

Figure 5:
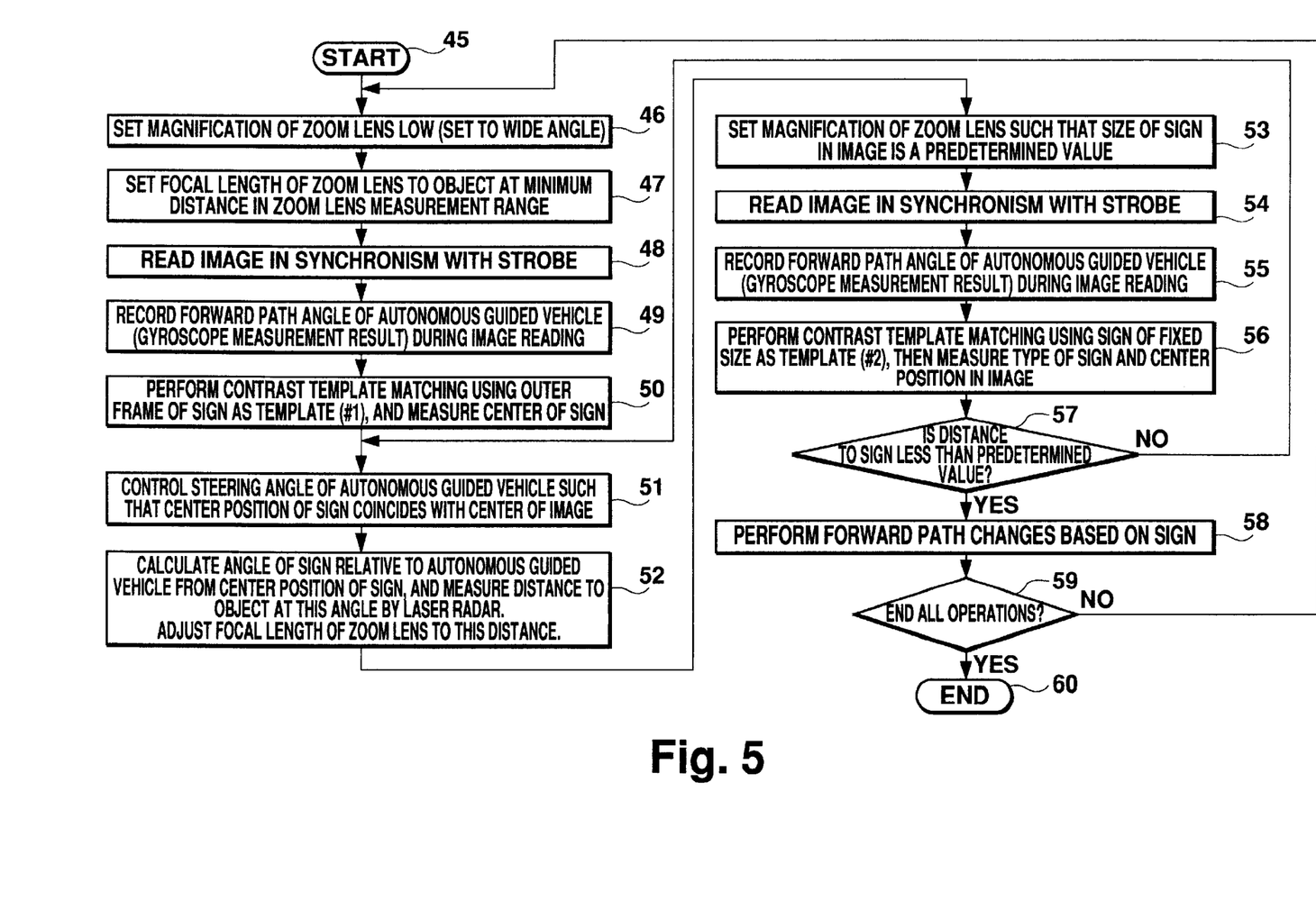
FIG. 5 is a diagram showing a computer algorithm according to the first embodiment of this invention.

FIG. 5 is a flowchart showing the operations performed by the control computer 30.

The routine is started in a step 45, and the zoom lens 20 is set to a wide angle in a step 46. Next, in a step 47, the distance from the autonomous guided vehicle 1 to the sign 27 is measured using the laser radar 23, and the focal length of the zoom lens 20 is adjusted to this distance measurement result. In a step 48, when the image angle and focal length of the zoom lens 20 are sufficiently close to target values, the image is captured by the imaging device 21 in synchronism with the lighting of the strobe 22. Simultaneously, in a step 49, the travel path direction angle measurement result is recorded as old_gyro by the gyroscope 29. Subsequently, in a step 50, contrast template matching is performed by the image processor 28 using the outer frame of the sign 27 as a template, and the center point of the sign 27 is calculated.

Figure 6:
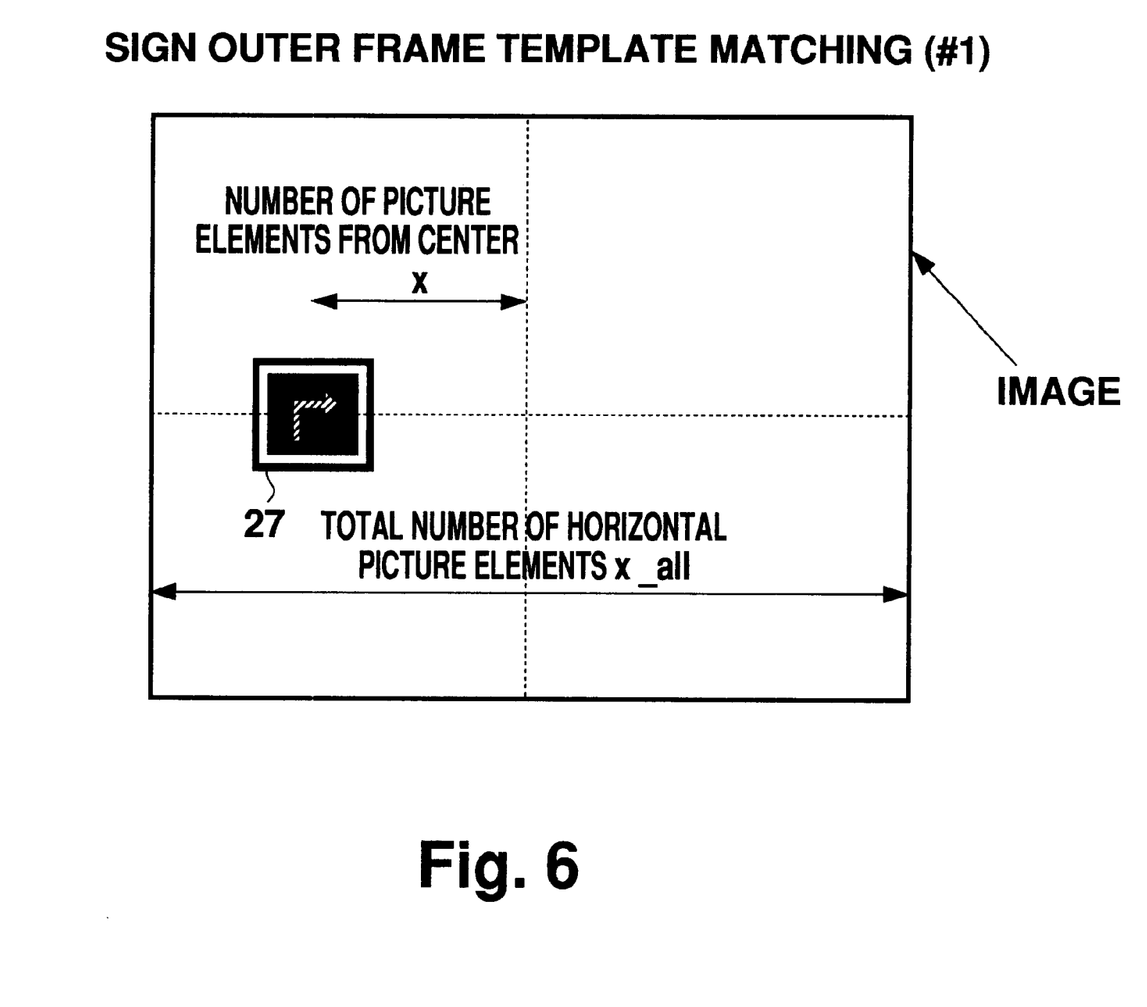
FIG. 6 is a diagram showing a sign outer frame according to the first embodiment of this invention.
Figure 7:
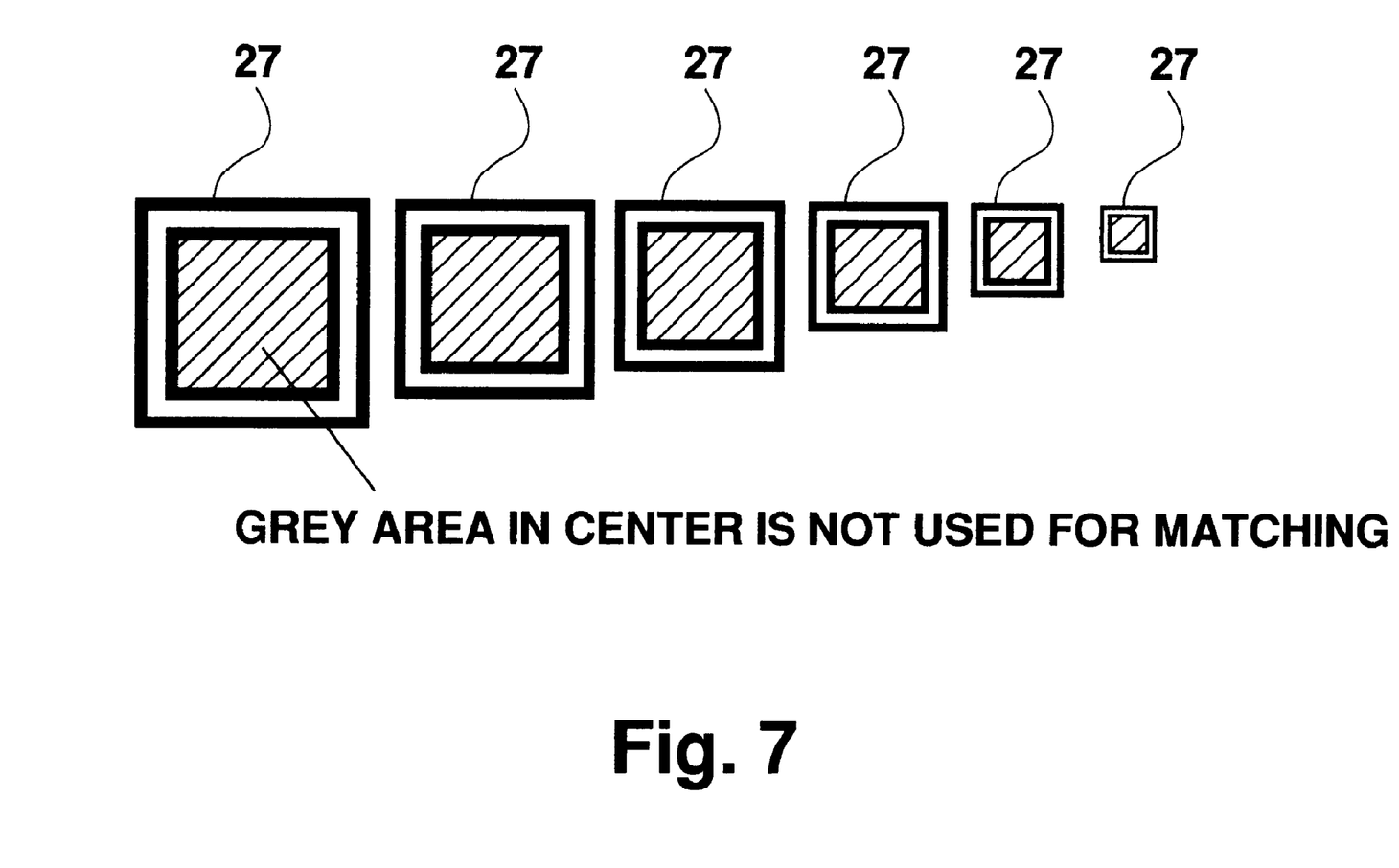
FIG. 7 is a diagram showing an outer frame template according to the first embodiment of this invention.

FIG. 6 shows contrast template matching using the frame of the sign 27 as a template, and FIG. 7 shows the outer frame template of the sign 27. The outer frame template matching of the sign 27 will now be described based on FIG. 6 and FIG. 7.

As shown in FIG. 7, a sufficient number of outer frame templates ranging from small to large, wherein only the outer frame of the sign 27 is extracted, are first provided. In this outer frame template, the center area may be any pattern and is not used for comparing with the image. FIG. 6 illustrates an image scanned by the imaging device 21. An image of the sign 27 appears to the left of the middle of the image. Starting from the large template in FIG. 7, partial images which are identical to the template in the image are searched in sequence. An angle from the autonomous guided vehicle 1 to the sign 27 is calculated from a displacement x (number of picture elements) from the center of the partial image which is found to coincide. The angle theta to the sign 27 is given by Expression 1 where the total number of horizontal picture elements in the image is x_all, and the angle of the zoom lens 20 is zoom_angle.

Expression 1

$$\theta = \text{zoom\_angle} \cdot x / x\_\text{all}$$

In a step 51 of FIG. 5, the steering angle of the autonomous guided vehicle 1 is controlled such that the result measured by the gyroscope 29 is equal to the sum of the aforesaid calculation result theta and the forward path direction angle old_gyro of the autonomous guided vehicle 1 recorded in the step 49. By the above procedure, the sign 27 is made to appear in the center of the display of the imaging device 21. Next, in a step 52, the distance to an object in the direction of the angle theta of the sign 27 relative to the vehicle 1, is measured by the laser radar 23. The focal length of the zoom lens 20 is adjusted to this measured distance. In a step 53, the angle of the zoom lens 20 is adjusted so that the size of the sign 27 in the display of the imaging device 21 is a predetermined value. An angle zoom of the zoom lens 20 is given by Expression 2, where the length of the sign in the horizontal direction is wide, a target size (number of picture elements) of the sign 27 in the display is size, and the distance from the vehicle 1 to the sign 27 is length.

Expression 2

$$\text{zoom} = \arctan((\text{wide} \cdot x\_\text{all}/(\text{size}/\text{length})))$$

Figure 8:
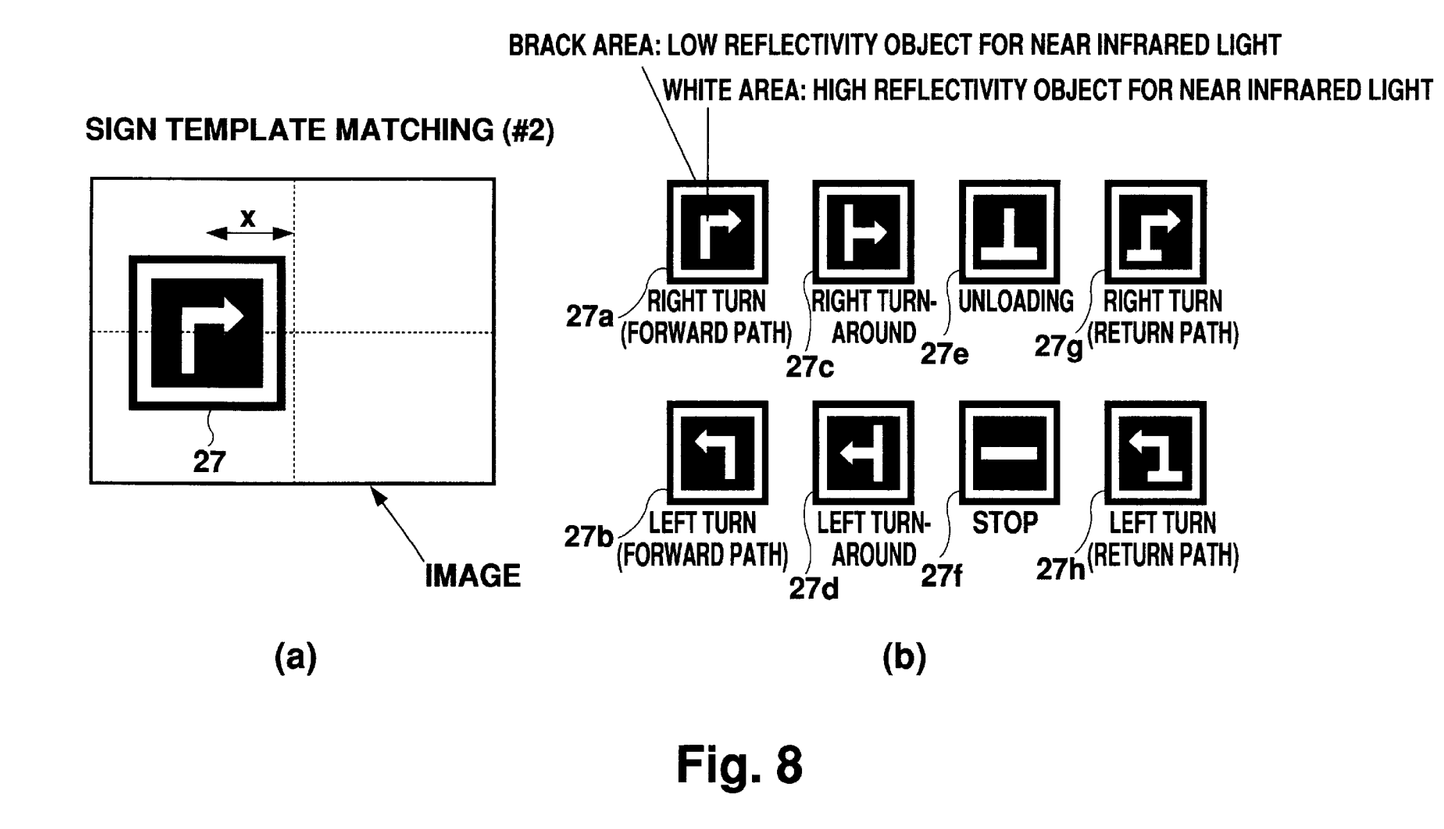
FIG. 8 is a diagram showing sign template matching according to the first embodiment of this invention.

In a step 54 of FIG. 5, when the image angle and focal length of the zoom lens 20 are sufficiently close to the target values, the image is read by the imaging device 21 in synchronism with the lighting of the strobe 22. Simultaneously, in a step 55, the travel path direction angle measurement result of the vehicle 1 obtained by the gyroscope 29 is recorded as old_gyro. Next, in a step 56, contrast template matching of the sign 27 is performed by the image processor 28 on the read image, and the center point of the sign 27 is calculated. FIG. 8(a), FIG. 8(b) show contrast template matching of the sign 27. Herebelow, template matching of the sign 27 will be described based on FIG. 8(a), FIG. 8(b).

FIG. 8(a) shows the image read by the imaging device 21, and FIG. 8(b) shows patterns of the sign 27 in comparison to FIG. 8(a). The sign 27a indicates a right turn (forward path), 27b indicates a left turn (forward path), 27c indicates a right turnaround, 27d indicates a left turnaround, 27e indicates unloading, 27f indicates stop, 27g indicates a right turn (return path), and 27h indicates a left turn (return path). To prevent errors in recognizing the signs when the same route is used for the forward path and return path, separate left turn and right turn signs are provided on each path. During image reading by the imaging device 21, the sign 27 has a predetermined size due to the processing of the step 53 of FIG. 5. In the read image, a partial image which coincides with a pre-prepared sign template is searched. The angle theta from the vehicle 1 to the sign 27 is calculated from the displacement (number of picture elements) x from the center of the partial image which was found to coincide by the same method as that of the step 50. It is also determined which of the signs 27a to 27h corresponds to the sign 27.

In a step 57 of FIG. 5, the distance from the vehicle 1 to the sign 27, and the magnitude of a preset value, are determined. When the distance is shorter than the preset value, the routine proceeds to a step 58. When the distance is longer than the preset value, the routine returns to the step 51, and processing continues. In the step 58, processing such as travel path alterations are performed based on sign determining results. Next, in a step 59, the type of sign is determined, and when the sign is a stop sign, the routine proceeds to a step 60 and all processing is terminated. When the sign is not a stop sign, the routine returns to the step 46, and the processing sequence is continued. In the automatic transport mode, the control computer 30 repeats the aforesaid operations, so the vehicle always moves automatically to the target position as indicated by the signs on the travel path, unloads materials, and automatically returns to the operation start point.

Embodiment 2

Figure 9:
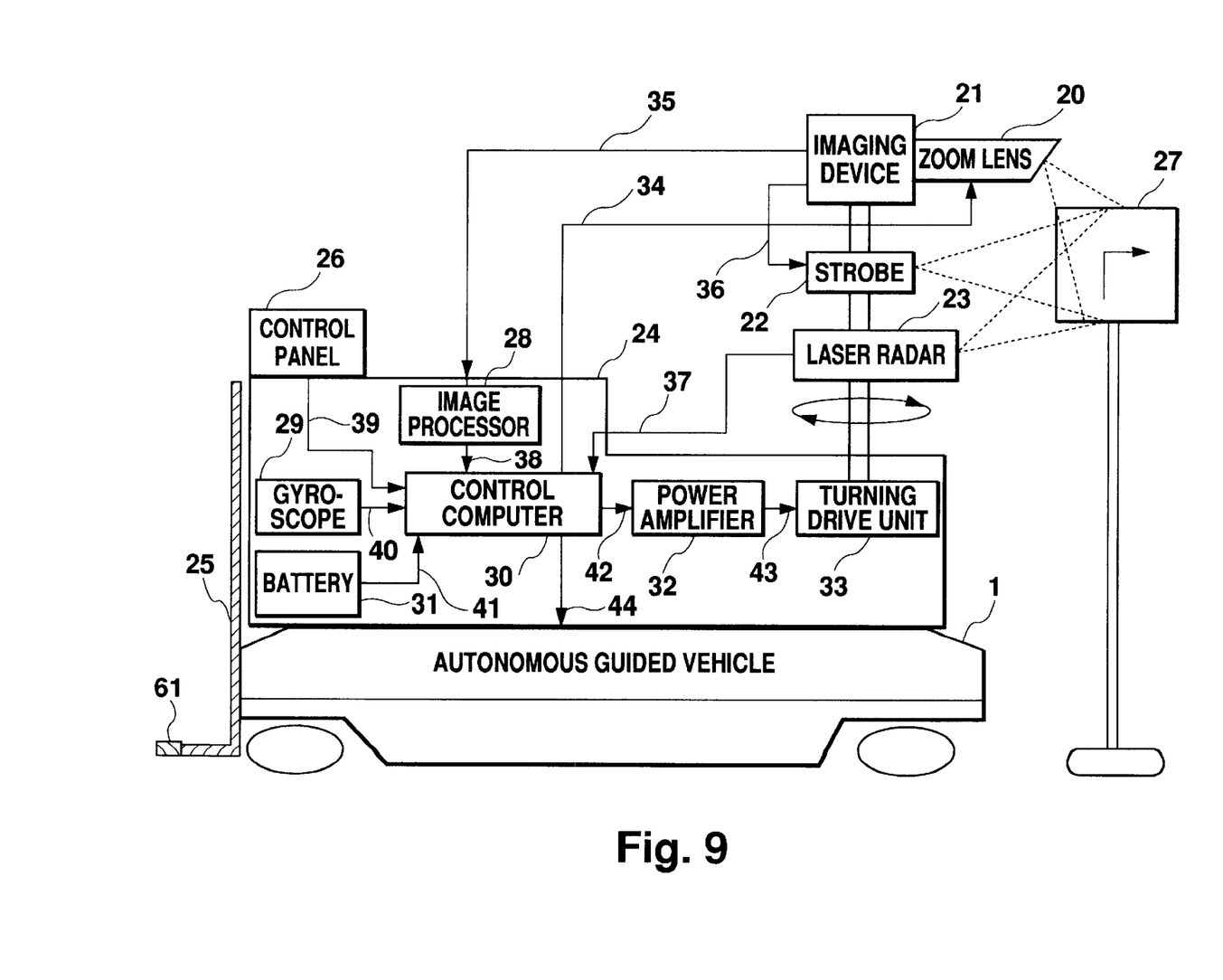
FIG. 9 shows a block diagram of the autonomous guided vehicle and the sign according to the first embodiment of this invention.

FIG. 9 is a block diagram of an automatic transport vehicle and a sign indicating a transport path illustrating a second embodiment of this invention. 61 is an opto-electric switch provided in front of the hooks which hold materials.

When materials are unloaded at an unloading site, it may occur that a plurality of materials are to be aligned next to each other in front of an unloading sign as shown in FIG. 4. FIG. 9 shows one way of resolving this problem with the opto-electric switch 61. When the opto-electric switch 61 provided in front of the vehicle hooks detects that materials have been placed in front, before the vehicle approaches the unloading position indicated by the unloading sign 27e, the unloading operation is performed continuously. A plurality of materials may therefore be unloaded without modifying the program. The remaining features of the construction are identical to those of the first embodiment.

Embodiment 3

Figure 10:
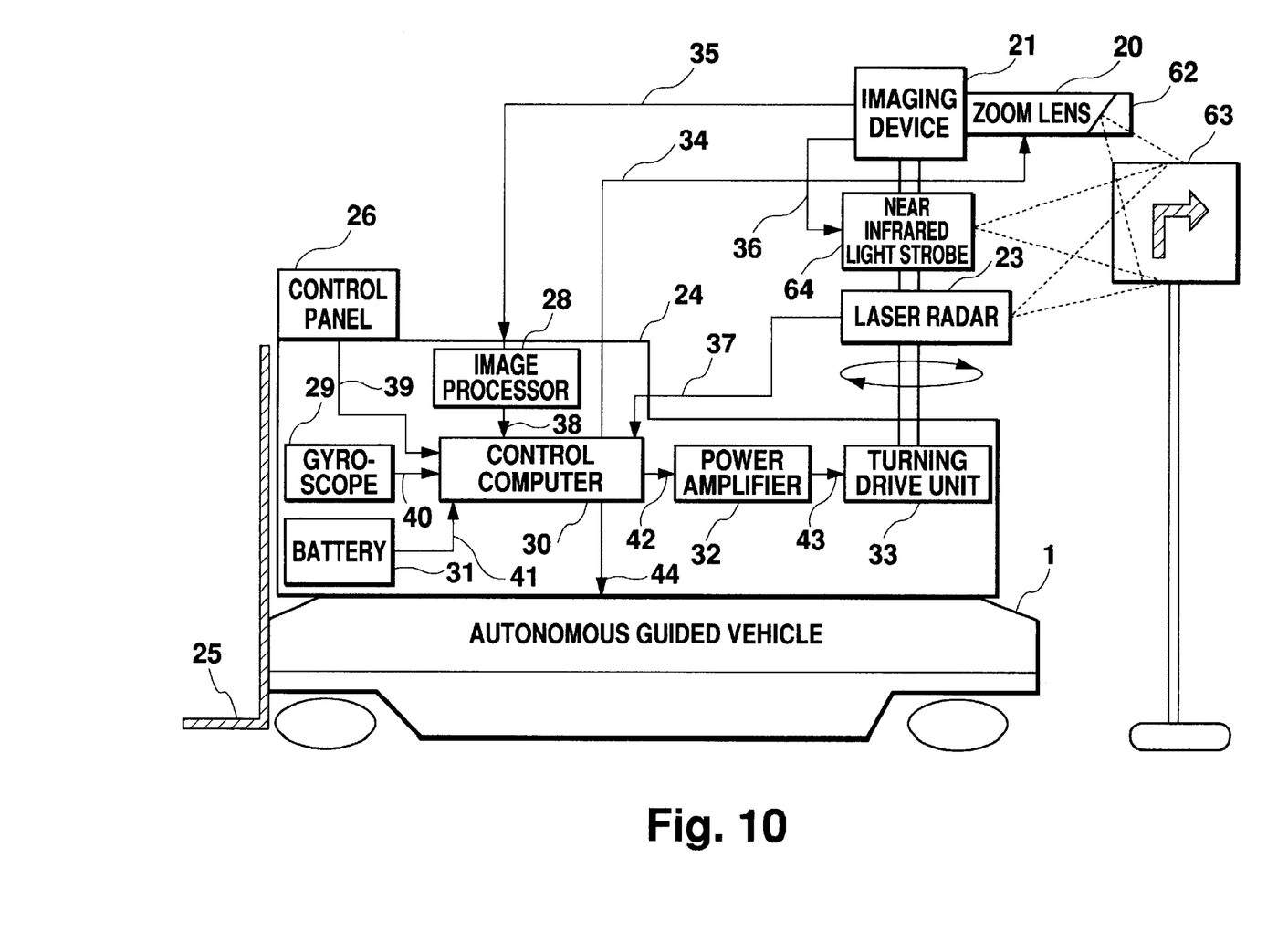
FIG. 10 shows a block diagram of the autonomous guided vehicle and the sign according to a third embodiment of this invention.

FIG. 10 is a block diagram of an autonomous guided vehicle and a sign indicating a transport path illustrating a third embodiment of this invention. 62 is a visible light cut filter which transmits near infrared light (wavelength approx. 850 nm) but cuts out visible light. 63 is a sign provided with a reflecting sheet on which a pattern is drawn. 64 is a near-infrared strobe.

When an image of the sign 63 is obtained by the imaging device 21, the near infrared light strobe 64 (wavelength approx. 850 nm) is illuminated by the sign provided with reflecting sheet 63 in synchronism with the reading of the image. As the reflecting sheet attached to the sign has a higher reflectivity than other tools and materials on the building site, a bright image may be obtained of the sign alone, and the image signal to noise ratio can be improved. As a result, image recognition efficiency is enhanced, and incorrect operation occurs less frequently.

As suspended dust in the building site has a lower reflectivity for near infrared light (wavelength approx. 850 nm) than for visible light, incorrect operation due to dust also occurs less frequently. Moreover, as near infrared light (wavelength approx. 850 nm) is invisible to the human eye, signs may be illuminated in a dark building site without blinding workers' eyes. The remaining features are identical to those of the first embodiment.

Embodiment 4

The vehicle is provided with a flux gate compass (magnetic orientation sensor) instead of the gyroscope of the first embodiment with exactly the same effect as a gyroscope, and the vehicle can therefore be controlled exactly as in the first embodiment.

Embodiment 5

The vehicle is provided with milliwave radar instead of the laser radar of the first embodiment with exactly the same effect as laser radar, and the vehicle can therefore be controlled exactly as in the first embodiment.

Embodiment 6

The vehicle is provided with a near infrared distance sensor instead of the laser radar of the first embodiment with exactly the same effect as laser radar, and the vehicle can therefore be controlled exactly as in the first embodiment.

Embodiment 7

The vehicle is provided with an ultrasonic distance sensor instead of the laser radar of the first embodiment with exactly the same effect as laser radar, and the vehicle can therefore be controlled exactly as in the first embodiment.

Embodiment 8

The vehicle is provided with an engine generator instead of the battery of the first embodiment with exactly the same effect as a battery, and the vehicle can therefore be controlled exactly as in the first embodiment.

Due to the aforesaid construction, the invention offers the following advantages.

According to the invention of the first embodiment, a sign which is easy to move is installed at a turning point or an unloading point on a work floor transport route, this sign displaying operating instructions in the form of an abstract pattern that may immediately be understood even by human beings. An image of the sign is obtained by an imaging device on an autonomous guided vehicle, and as the operating instructions are recognized by performing image processing, the autonomous guided vehicle may be automatically controlled. As a result, route settings, changes and operation sequence changes can be accomplished simply by moving or changing the sign, and material transport efficiency can be increased even in building site construction work which frequently requires changes to be made to routes and the number of unloading points.

According to the invention of the second embodiment, during unloading, materials placed on a floor can be detected by an opto-electric switch installed at the front of hooks, so a plurality of materials may be aligned next to each other without any special programming or addition of signs.

According to the invention of the third embodiment, a sign image signal to noise ratio is improved by a strobe emitting near infrared light, a zoom lens with a visible light cut filter and a homing type reflecting sheet, so incorrect operation due to dust on the site occurs less frequently.

According to the inventions of the third to eighth embodiments, the same effect as that of the first invention is obtained with high cost-performance according to the application (size of building site, working time, etc.).

What is claimed:

1. An autonomous guided vehicle guidance device comprising:
    an autonomous guided vehicle which performs route change and stop operations;
    a plurality of signs indicating a plurality of subsequent operations of said autonomous guided vehicle which are disposed on the guidance route of said vehicle and which are movable to different locations;
    imaging means for obtaining an image of at least one of said plurality of signs disposed in front of said vehicle;
    extracting means for detecting a minimum distance sign which is one of said plurality of signs at a minimum distance from said vehicle when said more than one of said plurality of signs appear in said image obtained by said imaging means or detecting one of said plurality of signs when only said one of said plurality of sign appears in said image obtained by said imaging means, and extracting information for performing a subsequent operation contained in said detected sign; and
    vehicle controlling means for generating a vehicle control signal according to said information extracted by said extracting means and instructing said vehicle to perform an operation change thereby.

2. An autonomous guided vehicle guidance device as defined in claim 1, wherein said imaging means comprises a zoom lens for varying an image angle such that an image of said detected sign is a preset size, wherein said extracting means extracts said information for performing said subsequent operation when an image of said minimum distance sign has been arranged to be said preset size by said zoom lens.

3. An autonomous guided vehicle guidance device as defined in claim 2, wherein said autonomous guided vehicle comprises means for measuring a distance between said detected sign and said autonomous guided vehicle, and said zoom lens comprises means for adjusting a focal length according to said distance supplied by said distance measuring means and varying an image angle such that an image of said detected sign is said preset size.

4. An autonomous guided vehicle guidance device as defined in claim 1, wherein said autonomous guided vehicle comprises a hook for holding and setting down materials, and said device comprises means for controlling said hook to set down said materials based on the instructions of said detected sign.

5. An autonomous guided vehicle guidance device as defined in claim 1, wherein said detected sign comprises information for performing one of the subsequent operations of right turn, right turnaround, left turn, left turnaround and stop, and adding identifying information for a forward route or a return route to said information for performing one of the plurality of subsequent operations.

6. An autonomous guided vehicle guidance device comprising:
    an autonomous guided vehicle which travels on the work floors of a building construction site;
    a hook for holding a material at the front of said vehicle;
    a computer for controlling said vehicle;
    an operating panel for inputting startup and stop commands of said autonomous guided vehicle guidance device;
    an imaging device for obtaining an image of a sign;
    a zoom lens which maintains a constant size display of said sign by varying a focal length and image angle according to a distance to said sign;
    a strobe for illuminating said sign in front;
    means for measuring a distance to said sign appearing in said zoom lens;
    an image processing device for extracting and recognizing said sign based on an image signal from said imaging device;
    means for detecting an angle of an inertial system onboard said vehicle;
    means for supplying power to a vehicle drive unit, said controlling computer, said imaging device, said zoom lens, and said strobe;
    turning drive means for turning said distance measuring means, said strobe and said imaging device;
    a power amplifier for supplying a turning drive signal to said turning drive means; and said sign installed at a change-over point or an unloading point for indicating a curve or change of direction;

wherein said detected angle and said image of the sign provide an indication of the curve or change in direction which is processed by controlling computer to provide a control command for guiding said vehicle.

7. An autonomous guided vehicle guidance device as defined in claim 6, wherein said means for measuring said distance is a laser radar, said means for detecting said angle is a gyroscope, and said means for supplying power is a battery.

8. An autonomous guided vehicle guidance device as defined in claim 6, wherein an opto-electric switch is provided at the front of said material holding hook which permits a material lying on a floor surface to be detected.

9. An autonomous guided vehicle guidance device as defined in claim 6, wherein said strobe emits near-infrared light, said zoom lens is equipped with a visible light cut filter, and said sign has a light reflecting sheet on which a pattern is drawn.

10. An autonomous guided vehicle guidance device as defined in claim 6, wherein said means for detecting said angle is a flux gate compass (magnetic orientation sensor).

11. An autonomous guided vehicle guidance device as defined in claim 6, wherein said distance measuring means is a milliwave radar.

12. An autonomous guided vehicle guidance device as defined in claim 6, wherein said distance measuring means is an infrared distancing sensor.

13. An autonomous guided vehicle guidance device as defined in claim 6, wherein said distance measuring means is an ultrasonic wave sensor.

14. An autonomous guided vehicle guidance device as defined in claim 6, wherein said power supply means is an engine generator.

* * * * *